(12) United States Patent
Jabusch

(10) Patent No.: US 8,529,398 B2
(45) Date of Patent: Sep. 10, 2013

(54) FORCE LIMITING DEVICE FOR A MOTOR VEHICLE

(75) Inventor: Ronald Jabusch, Elmshorn (DE)

(73) Assignee: Autoliv Development AB, Vårgåda (SE)

( * ) Notice: Subject to any disclaimer, the term of this patent is extended or adjusted under 35 U.S.C. 154(b) by 230 days.

(21) Appl. No.: 13/063,490

(22) PCT Filed: Sep. 4, 2009

(86) PCT No.: PCT/EP2009/006409
§ 371 (c)(1),
(2), (4) Date: Mar. 11, 2011

(87) PCT Pub. No.: WO2010/037460
PCT Pub. Date: Apr. 8, 2010

(65) Prior Publication Data
US 2011/0172054 A1    Jul. 14, 2011

(30) Foreign Application Priority Data
Oct. 2, 2008   (DE) .......................... 10 2008 049 931

(51) Int. Cl.
*F16H 57/08* (2006.01)
(52) U.S. Cl.
USPC ......................................................... 475/331
(58) Field of Classification Search
USPC ........................ 475/331, 343, 344, 346, 347
See application file for complete search history.

(56) References Cited

U.S. PATENT DOCUMENTS

| 6,098,772 A * | 8/2000 | Kimmig et al. | 192/70.252 |
| 2002/0190515 A1* | 12/2002 | Birk et al. | 280/753 |
| 2005/0059524 A1* | 3/2005 | Hori et al. | 475/180 |
| 2005/0133330 A1 | 6/2005 | Stiefvater | |

FOREIGN PATENT DOCUMENTS

| DE | 202 09 965 | 12/2002 |
| DE | 10 2005 016 822 B3 | 1/2007 |
| FR | 2 528 928 | 12/1983 |
| WO | WO 2004/096611 A1 | 11/2004 |
| WO | WO 2006/108451 A1 | 10/2006 |
| WO | WO 2007/130041 A1 | 11/2007 |

OTHER PUBLICATIONS

Search Report—Apr. 7, 2009.
Search Report—Apr. 27, 2009.
International Search Report—Apr. 26, 2010.

* cited by examiner

*Primary Examiner* — Edwin A Young
(74) *Attorney, Agent, or Firm* — Brinks Hofer Gilson & Lione

(57) ABSTRACT

A load limiting mechanism for a motor vehicle, comprising at least two parts (1, 2, 10, 12, 16, 20, 21, 46, 22, 40) controlled relative to one another with a frequency controlled oscillating movement. The parts (1, 2, 10, 12, 16, 20, 21, 46, 22, 40) moving relative to one another comprise interlocking gears (3, 4, 13, 15, 24, 25, 26, 27) and the frequency controlled oscillating movement results thereby that at least one of the parts (1, 10, 21, 22) compared to the other part (2, 12, 16, 20, 40, 46) executes a wavelike oscillating feed motion, in which the gears (3, 4, 13, 15, 24, 25, 26, 27) alternately become engaged and disengaged thereby dissipating energy.

18 Claims, 12 Drawing Sheets

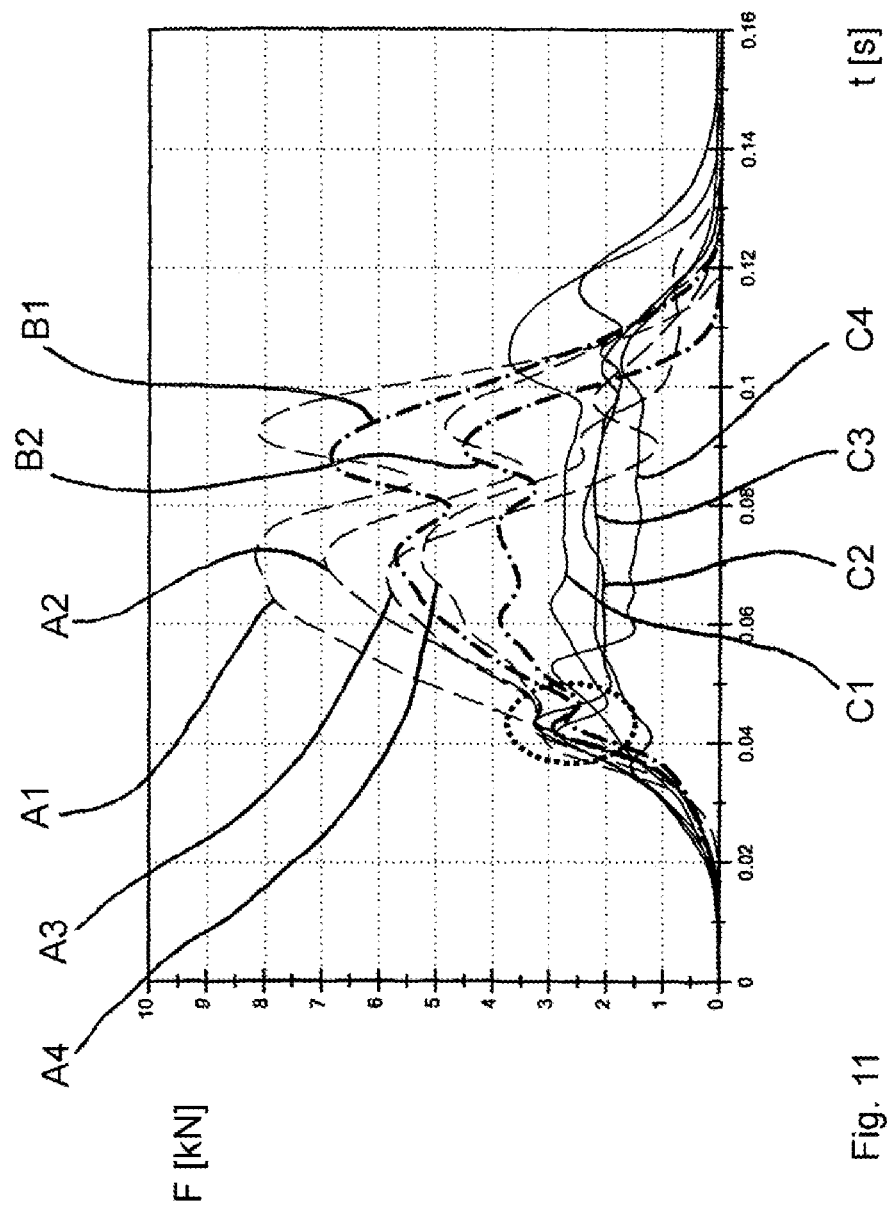

FORCE LIMITING DEVICE FOR A MOTOR VEHICLE

CROSS REFERENCE TO RELATED APPLICATIONS

This application claims priority to German Patent Application No. 10 2008 049 931.5, filed Oct. 2, 2008 and PCT/EP2009/006409, filed Sep. 4, 2009.

FIELD OF THE INVENTION

The invention relates to load limiting mechanisms for motor vehicles.

BACKGROUND OF THE INVENTION

Load limiting mechanisms are known in general from various applications in motor vehicles. Steering wheels are known, for example, which plunge in the case of an accident through the impact of an occupant, and comprise a mechanism for energy absorption by means of which the energy acting one the passengers is limited. Further, resilient deformation elements are provided in the entire vehicle structure through which the energy in the event of an accident is dissipated so that the energy acting on the passenger compartment is limited.

Further, it is known to provide load limiting elements in safety belts by means of which the energy acting on the occupants during their forward displacement is limited by means of a load limiting mechanism. For this, two-part belt retractor shafts, in particular with a torsion rod arranged between both parts of the belt shaft, have proven to be effective in practice. In the event of an accident, a part of the belt shaft is then locked to the vehicle, while the respective other part is connected with the safety belt and rotates in the belt extraction direction. During the relative rotation of both parts to one another, the torsion rod arranged between both parts is plastically deformed around the its own axis thereby dissipating energy, whereby the energy in the safety belt and force exerted on the occupant during the forward displacement of the occupant is correspondingly limited. The load limiting level determined through the characteristics of the torsion rod and cannot be changed.

From WO 2006/108451 A1, which stems from the Applicant, an improved load limiting system is known. The load limiting system described therein is formed from two parts moving relative to one another, whose movement to one another is controlled by a mass system oscillating with a predetermined frequency. The dissipation of energy thereby results by alternately delaying and accelerating the parts, whereby the frequency of oscillation is almost independent from the impacting force. Thereby, different load limiting levels can be realized with this load limiting system in response to the mass of the displaced parts and the vehicle deceleration occurring in the dangerous situation, whereby the frequency and the path of the forward displacement is approximately constant.

SUMMARY OF THE INVENTION

The object of the invention is to provide a load limiting mechanism with two parts executing a frequently controlled oscillating movement with a design that is simple and compact.

The solution of the object is effected whereby the two parts moving relative to one another are in the form of interlocking gears and a frequency controlled oscillating movement results thereby that at least one of the parts compared to the other part executes a wavelike feed motion by which the gears alternately become engaged and disengaged.

The basic idea of the invention is to be seen in the fact that the frequency conditional controlled movement is not effected by a separate mass system but that the parts themselves have gears and that at least one of the parts undergoes a wavelike feed motion which is controlled by the alternate engagement and disengagement of the gears. The control of the feed motion takes place therefore through the movement of the part itself so that a separate mass system is not necessary. Since the part undergoing the load limiting movement itself is also used for the execution of the energy-consuming oscillating movement, and the fact that this can already have a high mass due to its orientation, a very large amount of energy can be dissipated by the solution according to the invention without the weight of the retractor having to be increased unnecessarily through an additional mass system as is required in the prior art. Therefore, a greater load limiting level can be generated, or inversely, the force limiting device can be reduced for a predefined range of load limiting with the load limiting mechanism according to the invention. In addition, due to the interlocking of the gears, a large number of teeth adjacent to one another can be provided whereby a corresponding large overlapping is achieved and corresponding significant loads can be taken up. The load limiting characteristic capable of being produced with the force limiting mechanism is, moreover, equivalent with the one known from WO 2006/108451 A1 so that in this respect reference is explicitly made to this document.

It is further provided in accordance with this invention that the two parts moving relative to one another comprise at least a second pair of interlocking gears and the second pair of interlocking gears are separate from but coupled to the first pair of interlocking gears. Hereby, the part moving with a wavelike feed motion alternately is brought offset into engagement with two gears, whereby the frequency multiplies and the energy dissipation is substantially increased. Due to the increase of dissipated energy, the load limitation mechanism can be further reduced in size for an intended range of a load limitation level.

Preferably, the first and the second pair of interlocking gears are arranged on opposite sides on one of the parts, whereby at least two of the interlocking gears are arranged offset to one another at one part. Thereby, the bringing out of engagement of one pair of gears through the sliding of the tooth flanks automatically leads to a bringing into engagement of the other pair of interlocking gears so that the system with a corresponding orientation cannot stand still.

It is further recommended to arrange attenuation means between the interlocking gears so that the high starting speed is absorbed of the load limiting mechanism which adjusts itself due to the vehicle deceleration at the beginning of the load limiting action.

Further, it is recommended to arrange the load limiting mechanism at a belt shaft of a belt retractor and that the part undergoing the wavelike feed motion is connected with the belt shaft.

In this case, the part undergoing the feed motion is preferably formed by means of a rotational gear disk with an axial gear, and the gear disk with its axial gear can be engaged in a gear fixed to a housing. The feed motion occurs through the rotational movement of the gear disk so that this is unlimited in its length and, furthermore, independent from the position of the gear disk always the same number of teeth, preferably the entire gear, can be engaged with the gear fixed to the housing.

In order that load limiting generated by the load limiting mechanism has a predetermined base load, it is recommended that the gear disk is spring-loaded in the direction of the interlocking of the axial gear and the gear fixed to the housing.

Further, it is preferred that the axial gear is formed by teeth oriented radially to the center of the gear disk. The gear disk is thereby automatically centered by the axial gear since a deflection of the gear disk radially from the centered position is prevented by the teeth.

A further preferred embodiment of the invention is realized by providing a transmission between the belt shaft and the part undergoing the feed motion. Through this, the frequency of the feed motion can be configured which determines the load limiting level, independent of the rotational movement of the belt shaft in the safety belt extraction direction. In particular, the frequency of the feed motion can be increased so that the load limiting level is increased or the load limiting mechanism can be further reduced at a predefined load limiting level.

A particularly favourable form of the transmission is provided through use of a planetary gear unit, the belt shaft is non-rotationally connected with the planetary gear wheels, and the gear disk is formed by the sun wheel and/or an inner gear ring, which comprises radial interlocking gearing in which the planetary gear wheels engage. The planetary gear unit lends itself in this respect because it has a symmetrical construction and can be arranged in a spatially compact manner in a level, wherein very high transmission ratios and reduction gear ratios are possible with a very quiet operation, with small overall dimensions. Further, the rotational movement of the belt shaft can be induced by the connection via the planetary gear wheels at several points in the sun wheel and/or the inner gear ring so that there is a good overall distribution of the energy flow and thereby a reduction of the maximum forces occurring in the components.

It is further recommended that the load limiting level generated by the wavelike feed motion of the sun wheel and the level generated by wavelike feed motion of the inner gear ring are different. Therewith, two different load limiting levels can be provided with one and the same load limiting mechanism, depending on whether the sun wheel or the inner gear ring is driven.

In order that the level of the load limiting can be actively determined, it is further suggested that the sun wheel and/or the inner gear ring comprise a releasable locking mechanism. Through the locking of the sun wheel or the inner gear ring, it is automatically determined that the respective other part is driven and therewith determines the load limiting level.

In this case, the releasable locking mechanism is preferably coupled to the sun wheel or to the inner gear ring, which generate, respectively, the lower load limiting level by the wavelike feed motion. Therewith the higher load limiting level functions at the beginning of the load limiting action whereas after the locking mechanism has been released, the lower load limiting level automatically functions since the part with the higher load limiting level automatically functions as a fixed bearing without requiring a separate locking mechanism for this purpose.

Further, the load limiting mechanism can comprise a housing and means for limiting the rotational angle are provided between the housing and the belt shaft and/or the planetary gear unit so that the forward displacement during the load limiting is restricted whereby the limiting naturally does not have to occur abruptly but can also occur correspondingly to that of a delayed increase.

In this case, it is further recommended that the means are formed by one or a plurality of gear wheels which mesh in a gear coupled to the housing and a gear coupled to the belt shaft or to the planetary gear unit, and the channel formed by the two gears, tapers towards the end. The gears represent a guide of the relative rotation which, due to the tapering, further enables a very good chance of the braking of the relative rotation.

BRIEF DESCRIPTION OF THE DRAWINGS

In the following, preferred embodiments of the invention are described in detail with reference to the drawings. In the figures:

FIG. 11 shows curves of the load limiting for different passenger types and different impulses.

DETAILED DESCRIPTION OF THE INVENTION

In the FIGS. 1a to 1d, firstly, an exemplary embodiment of the invention can be seen in which the two parts 1 and 2 are provided which form a load limiting mechanism according to the invention and can be provided in different applications in the motor vehicle. One of the parts 1 or 2 is arranged in a fixed manner to the vehicle, in this case, part 2, while the respective other part 1 or 2, here part 1, undergoes a load limited movement. The part 1 can be, for example, a steering wheel or a part coupled to it, or a deformation member in the vehicle structure. The load limiting mechanism is suitable for many applications in motor vehicles in which energy is intended to be dissipated (by reducing the magnitude of acceleration). Accordingly, a load limited deformation or movement for the protection of the vehicle occupant or the passenger compartment is provided.

Figure 1A:
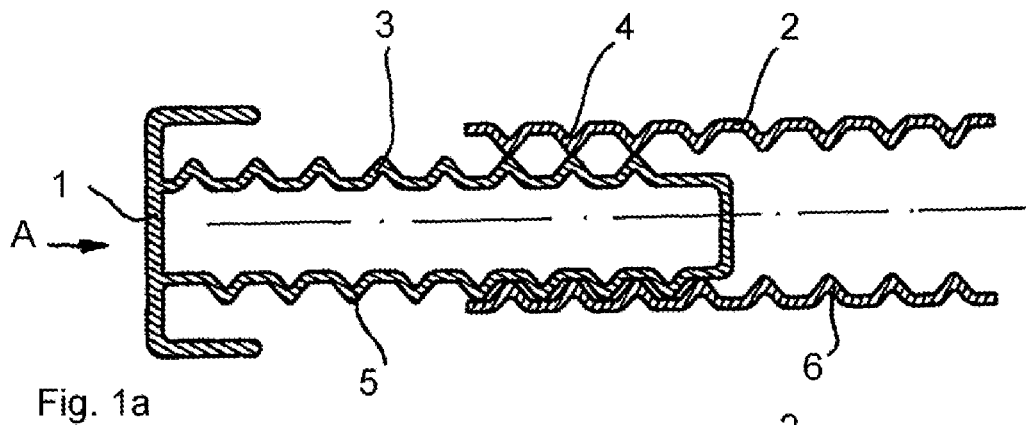
FIG. 1a-1d show a load limiting mechanism with two parts moved linearly to one another.
Figure 1B:
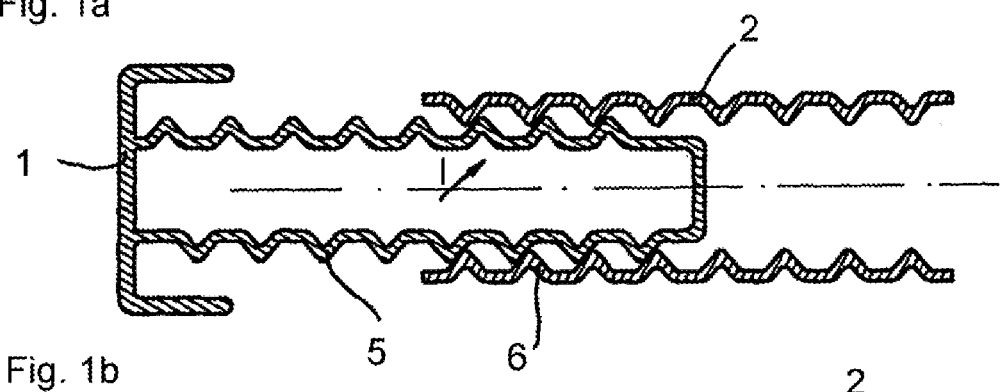
Figure 1C:
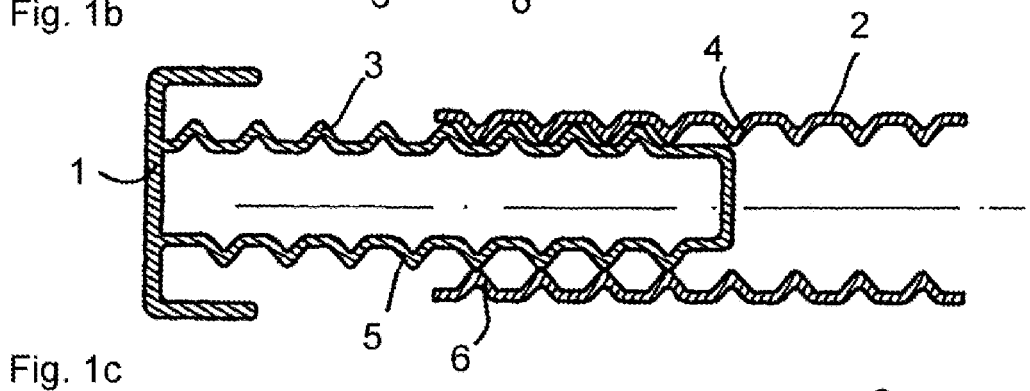
Figure 1D:
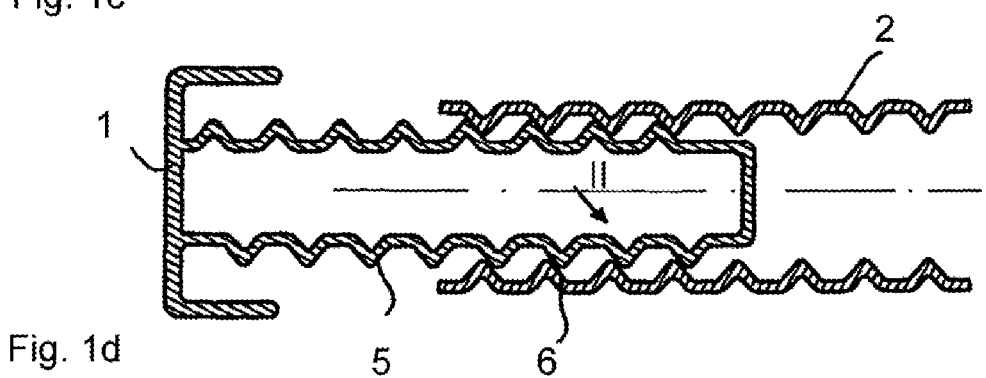

The part 1 is provided with gears 3 and 5 on its opposite sides and engages in a part 2 which is also provided with gears 4 and 6. In the position shown in FIG. 1a, the gears 5 and 6 are initially engaged. If a force is now exerted on the part 1 in the direction of arrow "A", then the gears 5 and 6 slip at their tooth flanks and the part 1 is accelerated in the direction of arrow "I" as can be seen in FIG. 1b. Through the sliding at the tooth flanks, the gears 5 and 6 become disengaged and the opposite gears 3 are 4 are forced into engagement until these have reached their engagement position represented in FIG. 1c. When the feed motion is further continued from the position illustrated in FIG. 1c, then the tooth flanks of the gears 3 and 4 begin now to slip together and the part 1 completes a movement in the direction of arrow "II" so that the gears 5 and 6 become engaged again.

The part 1 completes upon force effect a wavelike feed motion in the direction of arrow direction "A" formed from the alternating movements in the directions of arrows "I" and "II". Due to the constantly alternating acceleration and braking of part 1, energy is consumed and the desired load limited relative movement is produced.

Figure 2:
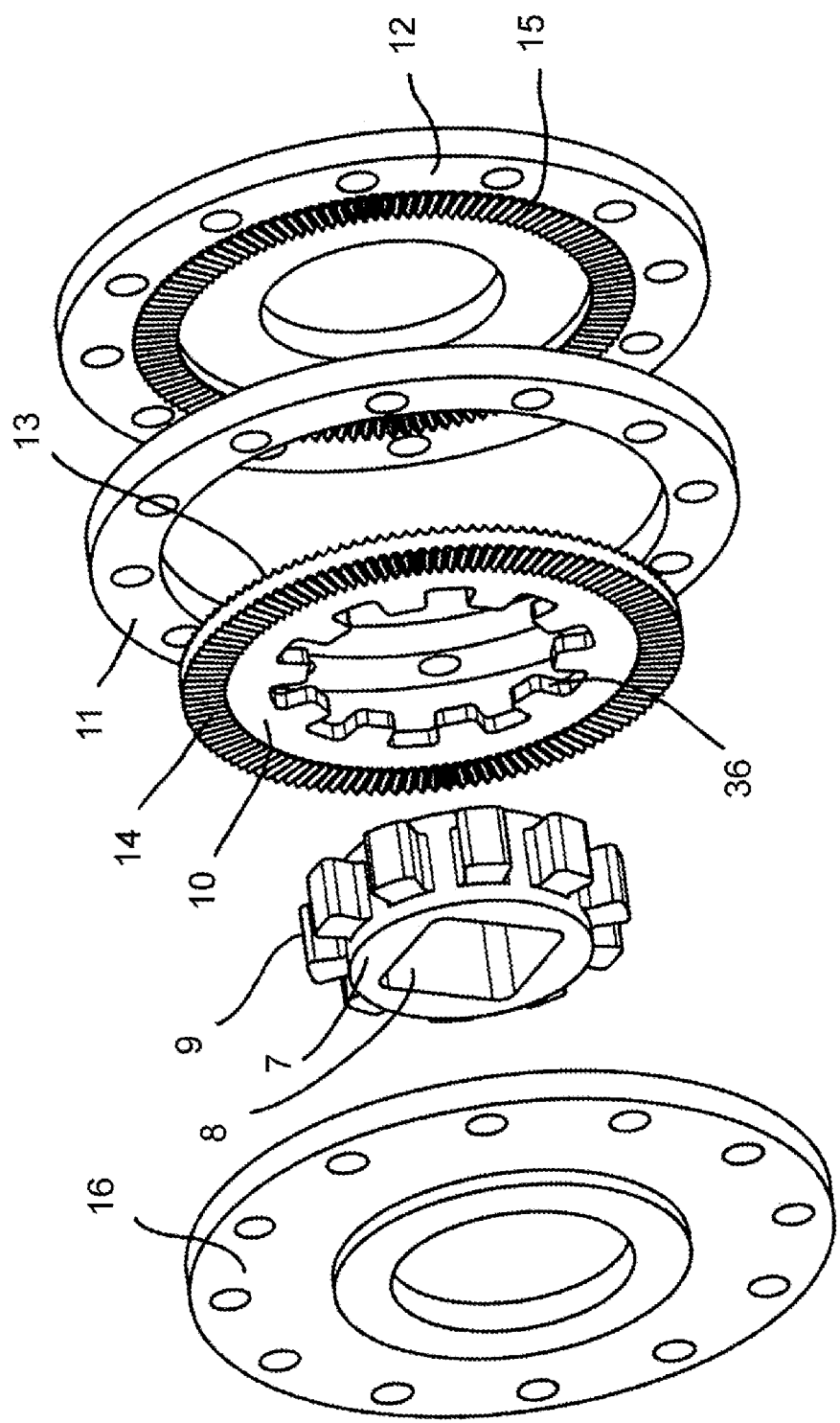
FIG. 2 shows the load limiting mechanism with a gear disk undergoing a rotational movement and meshing in a gear of the housing.

In FIG. 2 an alternative exemplary embodiment is illustrated in which the load limiting mechanism is coupled to a belt retractor not illustrated in detail. The load limiting mechanism enables the belt retractor to provide a load limited forward displacement of the passenger to reduce the passenger load exerted by the seat belt as is the case with previously known belt retractors with load limiting. The load limiting mechanism has a hub 7 which comprises in the center a square opening 8 for the connection to the belt retractor. The hub 7 is provided with a gear 9 on the outer side which engages in an inner gear 36 of a gear disk 10 and drives this with the locked belt retractor. The load limiting mechanism is arranged for this purpose either between two parts of a belt shaft, as this is known up to now from the torsion rods, or it is arranged between the locking part, also called a profile head, and the housing frame of the belt retractor. In the second case, the belt retractor locks not in the housing frame but in the load limiting mechanism.

The load limiting mechanism is formed by two fixed housing disks 16 and 12 between which, in the assembled condition, a spacer ring 11 is arranged. Further, the gear disk 10, which is driven by the belt shaft during the load limiting action, is arranged between the housing disks 16 and 12 which have gears 13 and 14 arranged on both sides offset to one another. The gears 13 and 14 engage in the gears assigned to the housing disks 16 and 12, wherein here only the gear 15 can be seen at the housing disk 12. The gears 13 and 14 are formed by teeth radially oriented to the center point of the gear disk 10, which are evenly distributed over the circumference of the gear disk 10 and, therefore, additionally cause a centering effect for the gear disk 10 compared to the fixed housing disks 16 and 12.

With the rotational drive of the gear disk 10 the latter undergoes a rotational relative movement to the housing disks 16 and 12, so that the gear disk 10 and the housing disks 16 and 12 here represent parts moving relative to one another. The gears 13 and 15, and the gear 14 and the gear of the housing disk 16 which cannot be seen, alternately become engaged and disengaged so that the gear disk 10 undergoes a wavelike oscillating feed motion described above which here, however, is a rotational movement rather than the linear relative movement described in connection with FIGS. 1a-d. Here, the part attached to the belt shaft, namely the gear disk 10, directly executes the energy dissipating oscillating movement. This offers the advantage that the costs are eliminated for the separate mass system and a part with a relatively large mass oscillates whereby a corresponding large amount of energy can be dissipated, or in other words, with a small load limiting mechanism, a relatively large load limiting level can be achieved. Through the excitation of a part as large as possible for executing the wavelike feed motion, a large number of teeth can also be provided which enable a significant attenuation and therewith a large load limiting level.

Further, the overlapping of the gears in comparison to the solution from the prior art is much greater so that significantly greater loads can be taken up, respectively, the parts for the same load limiting level can be designed smaller.

Figure 3:
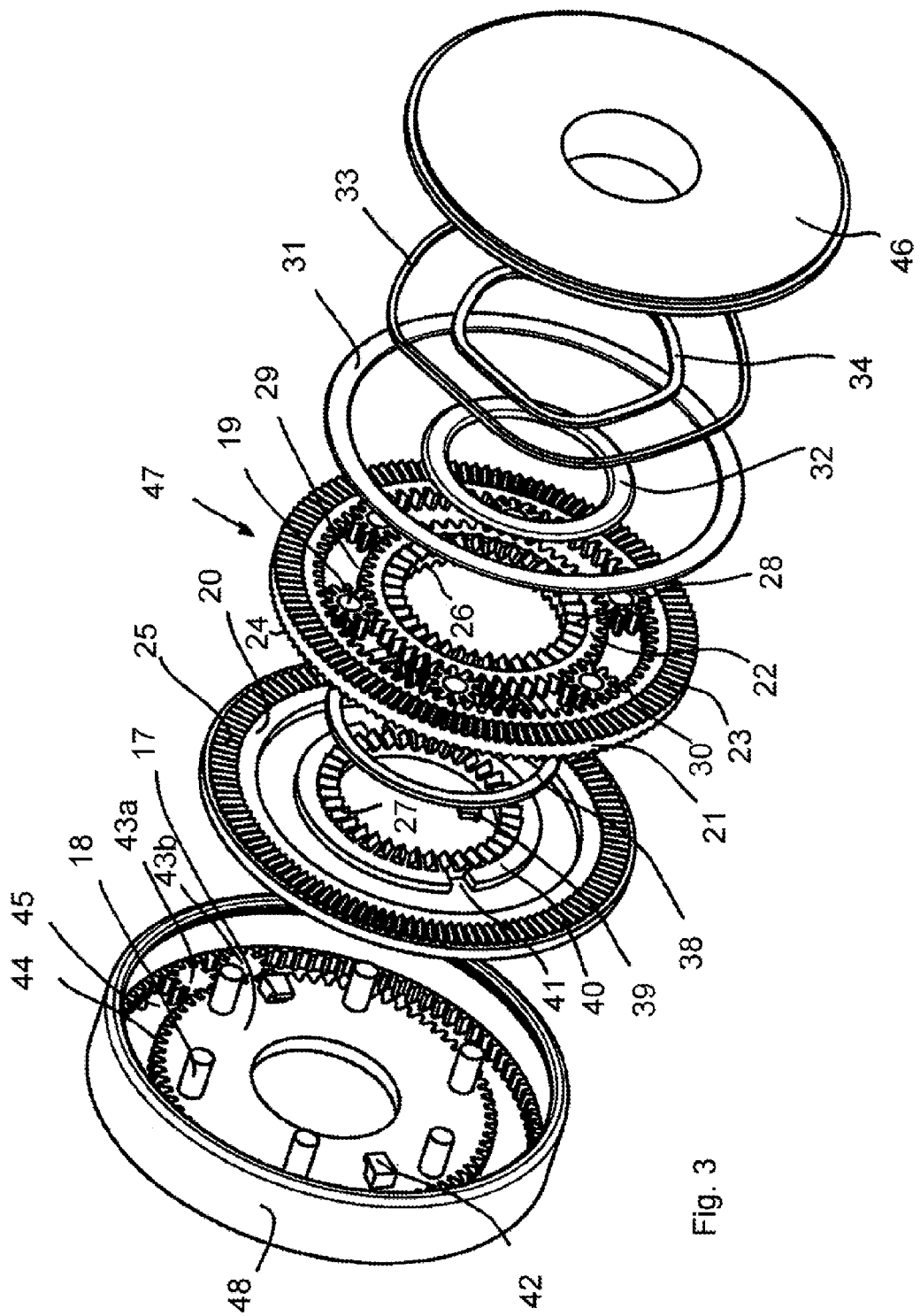
FIG. 3 shows an exploded view of a load limiting mechanism with a planetary gear unit.
Figure 4:
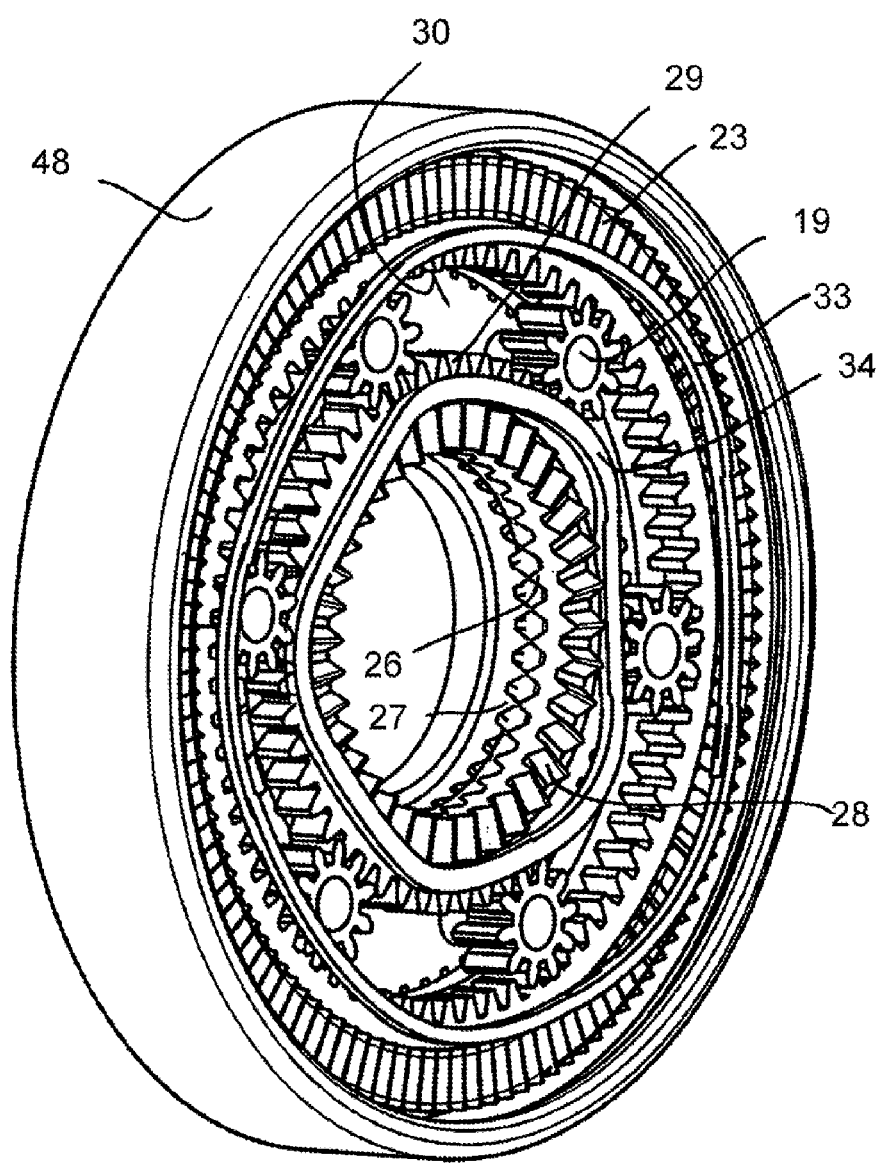
FIG. 4 shows a load limiting mechanism with a planetary gear unit in assembled condition without the housing cover.
Figure 5:
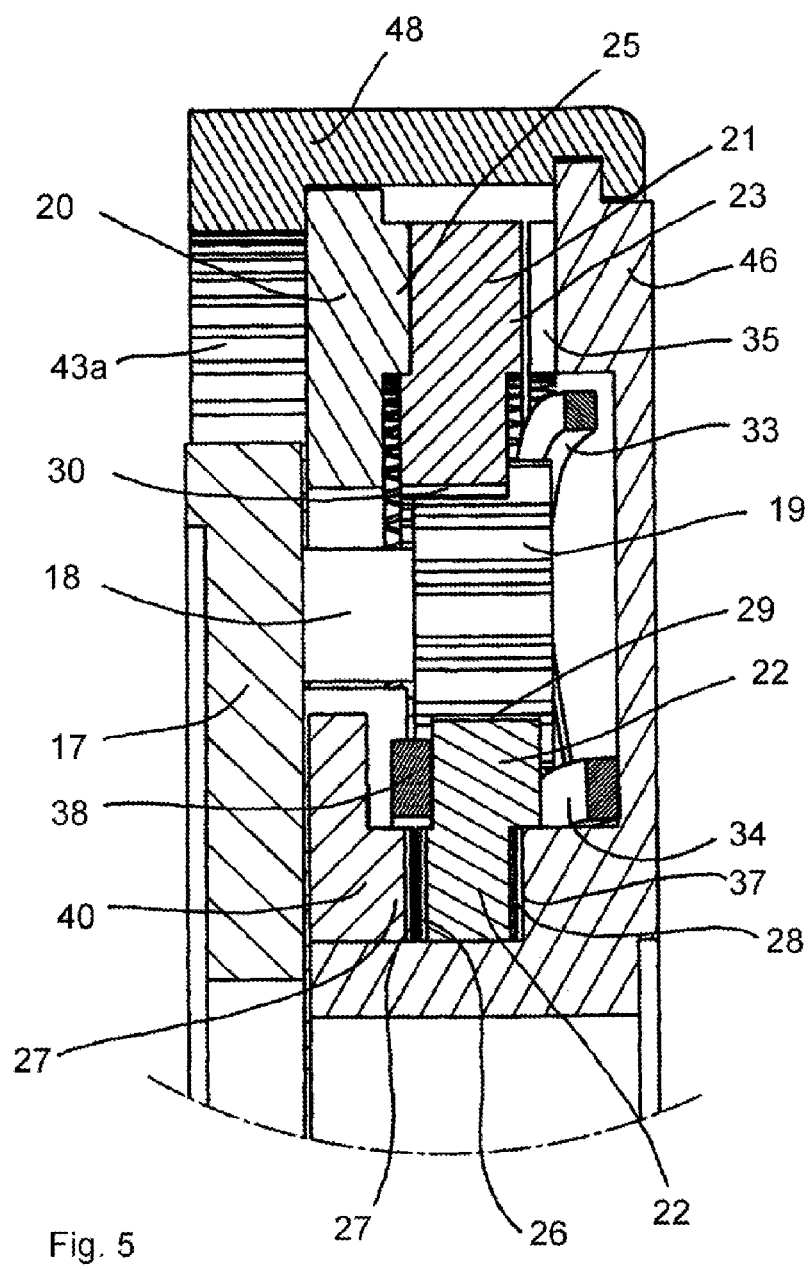
FIG. 5 shows a load limiting mechanism with a planetary gear unit in an assembled condition in cross-section.
Figure 6A:
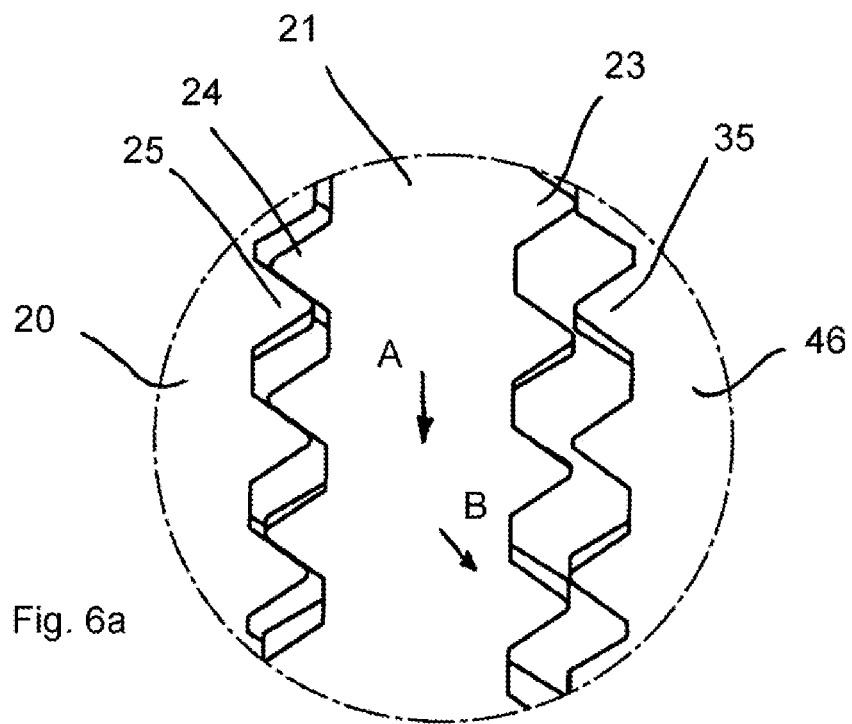
FIGS. 6a-6d show a wavelike feed motion of the gear disks during the load limiting action.
Figure 6B:
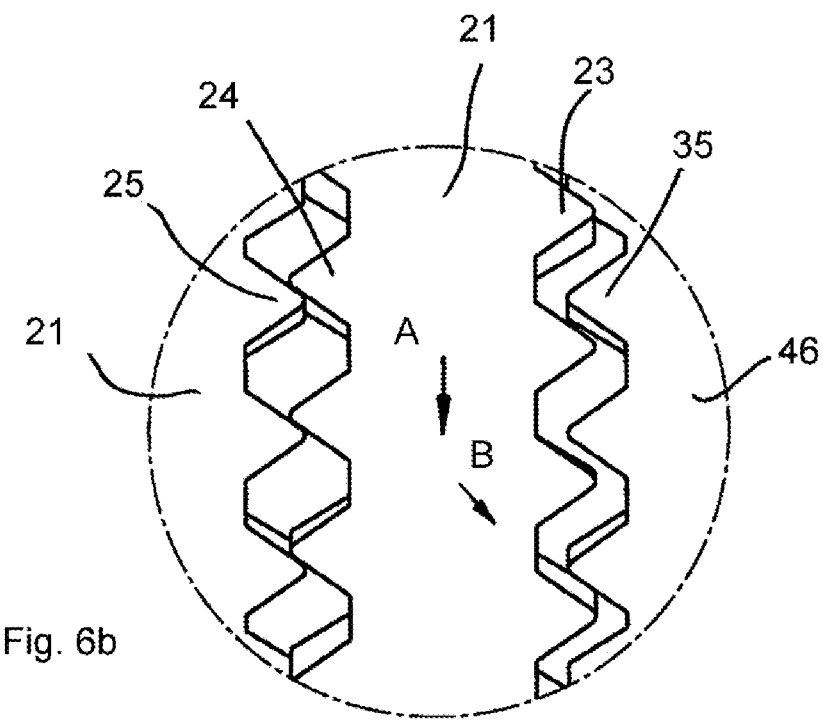
Figure 6C:
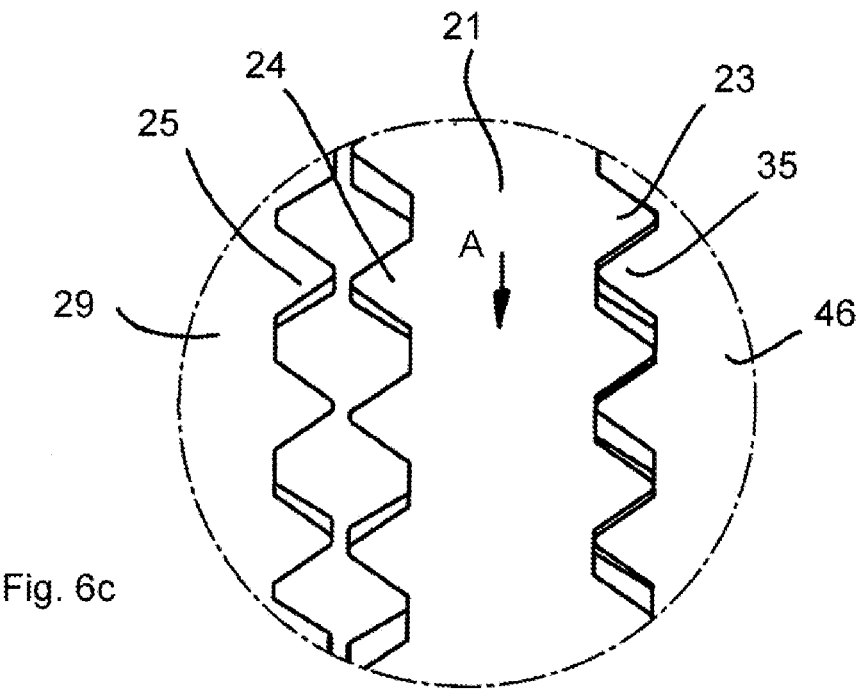
Figure 6D:
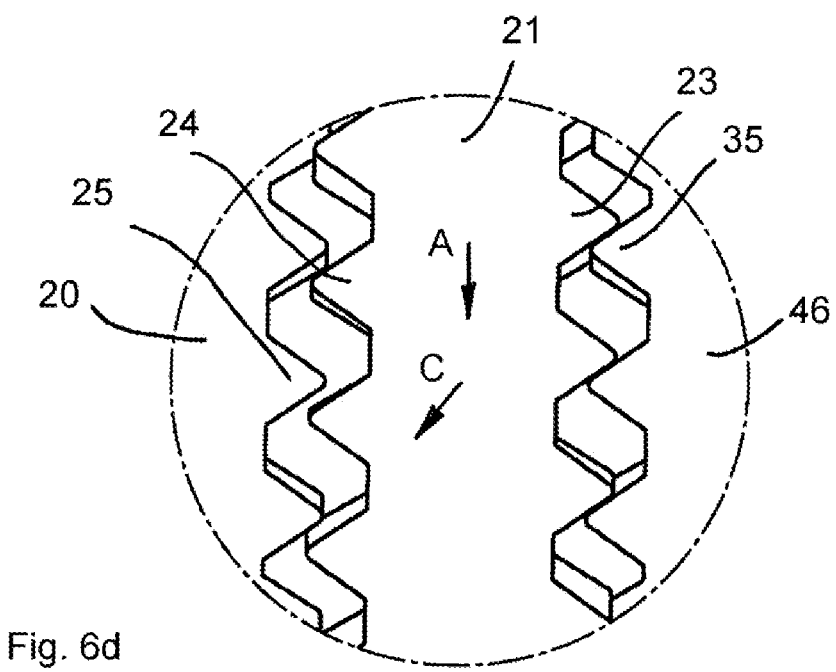
Figure 9:
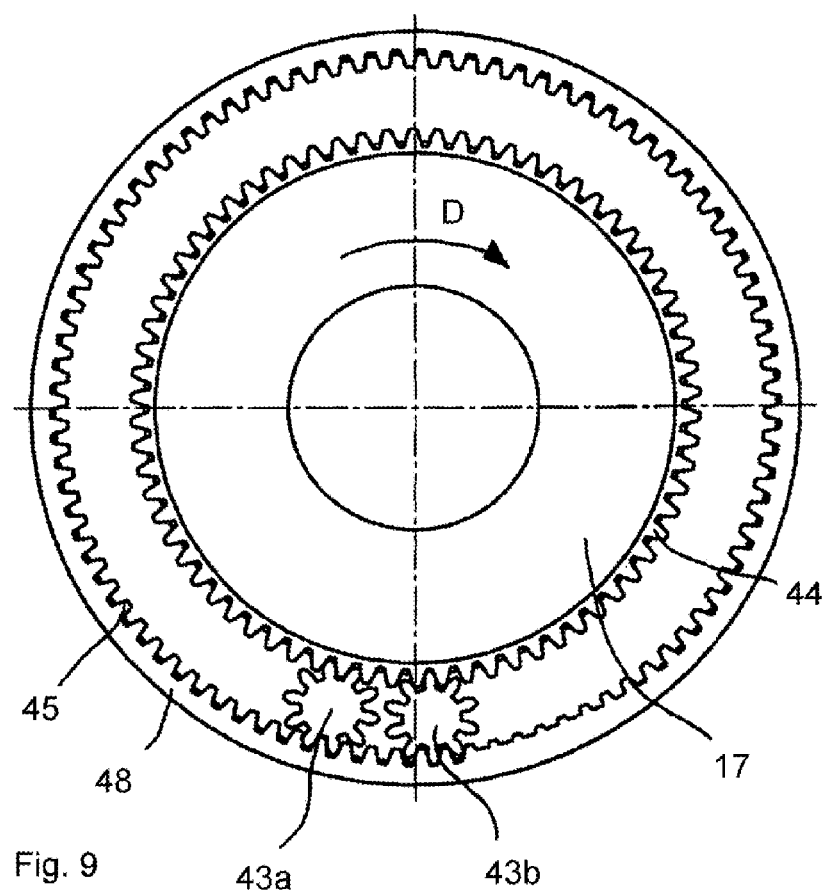
FIG. 9 shows the housing of the load limiting mechanism with inner gear, drive disk with outer gear, and gear wheels for limiting the rotational angle.

In the FIGS. 3 to 5, a further exemplary embodiment of a load limiting mechanism according to the invention can be seen with a planetary gear unit 47. The belt shaft not illustrated here is connected over a drive disk 17 which comprises an outer gear 44 and is arranged such that it forms a gear channel with an inner gear 45 of a housing 48 of the load limiting mechanism which is also illustrated in FIG. 9.

In the gear channel, the gear wheels (or planet gears) 43a and 43b are arranged which mesh in the fixed inner gear (or ring gear) 45 of the housing 48, and the rotating outer gear (or sun gear) 44 of the drive disk 17. The gear channel tapers towards the end so that the rotational movement of the drive disk 17 is limited in the direction of arrow "D" and the stopping of the drive disk 17 occurs attenuated.

The load limiting mechanism is provided here with a planetary gear unit 47 which is arranged between the fixed housing disk 46 and the gear rings 20 and 40 fixed to the housing. The drive disk 17 is provided with axially oriented pins 18 which engage in the planetary gear wheels (planet gears) 19 and drive them in the circumferential direction.

The planetary gear wheels 19 are in engagement with an outer gear 29 of a sun wheel 22 and an inner gear 30 of an inner gear ring 21. Both the inner gear ring 21 as well as the sun wheel 22 are provided with opposite axially oriented gears 23, 24, and 26, 28, which are arranged between the gears 25 and 27 arranged on the fixed gear rings 20 and 40, and the gears 35 and 37 of the housing disk 46. Between the gears 23, 25, 28 and 37, rubber rings 31 and 32 are arranged which function together as the attenuating means for the relative movement of the parts at the relative high initial speed at the start of the load limiting action. Further, spring rings 33 and 34 are provided which impinge the inner gear ring 21 and the sun wheel 22 axially with a spring force, and thus force the gears 24, 25 and 26, 27 into engagement.

The principle of load limiting is identical with the exemplary embodiment described in FIG. 2, only that here depending on whether the inner gear ring 21 or the sun wheel 22 is fixed, the respective other part executes the wavelike feed motion which here is also a rotational movement. Because the load limiting level generated by means of the wavelike feed motion of the inner gear ring 21 and the sun wheel 22 can be different, different levels of load limiting consequently can also be adjusted with this load limiting mechanism, depending on whether the inner gear ring 21 or the sun wheel 22 is driven.

The principle of load limiting is represented again in the FIGS. 6a to 6d on the basis of the movements of the gears 24, 25, 23 and 35 of the inner gear ring 21. The movement of the sun wheel 22 and the gear disk 10 from FIG. 2 during the load limiting is identical with that of the inner gear ring 21 and is not shown for this reason.

The inner gear ring 21 is initially driven in the direction of arrow "A" by the planetary gear wheels 19. Through the sliding down of the tooth flanks of the gears 24 and 25, a movement in the axial direction is superimposed on the circumferential movement in the direction of arrow "A" so that the inner gear ring 21 thereby moves in the direction of arrow "B" and the gears 24 and 25 are forced out of engagement and the gears 23 and 35 into engagement. After reaching the reversal position represented in FIG. 6c and the continuation of the feed motion, the inner gear ring 21 then moves oppositely in the direction in the arrow direction "C". Due to the constant braking and acceleration of the inner gear ring 21 in and out of the reversal positions, the energy is then kinematically reduced. The energy is then converted, for example, into heat, and thus lost energy occurs through friction.

Further, it can be seen in FIG. 5 how the switching ring 38 holds the sun wheel 22 in the position in which the gears 28 and 37 are engaged, although the sun wheel is impinged from the other side with a spring force by the spring ring 34 in the direction of the gear ring 40. Through this, the sun wheel 22 is fixed at the beginning of the load limiting so that it cannot execute any wavelike feed motion and, accordingly, is fixed opposite the housing disk 46. In this position, the load limiting level is exclusively determined by the described movement of the inner gear ring 21 and the sun wheel 22 can be regarded as a fixed bearing.

Figure 7:
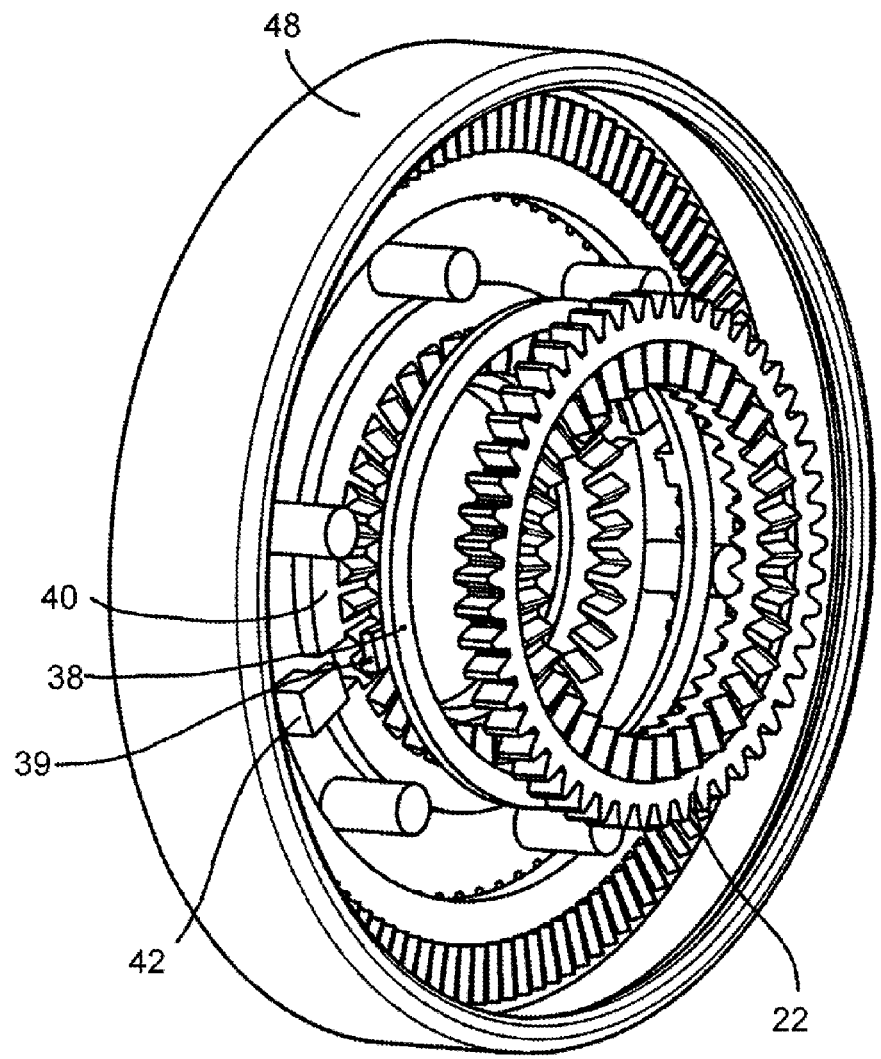
FIG. 7 shows the load limiting mechanism with a switching ring.
Figures 8A, 8B, 8C:
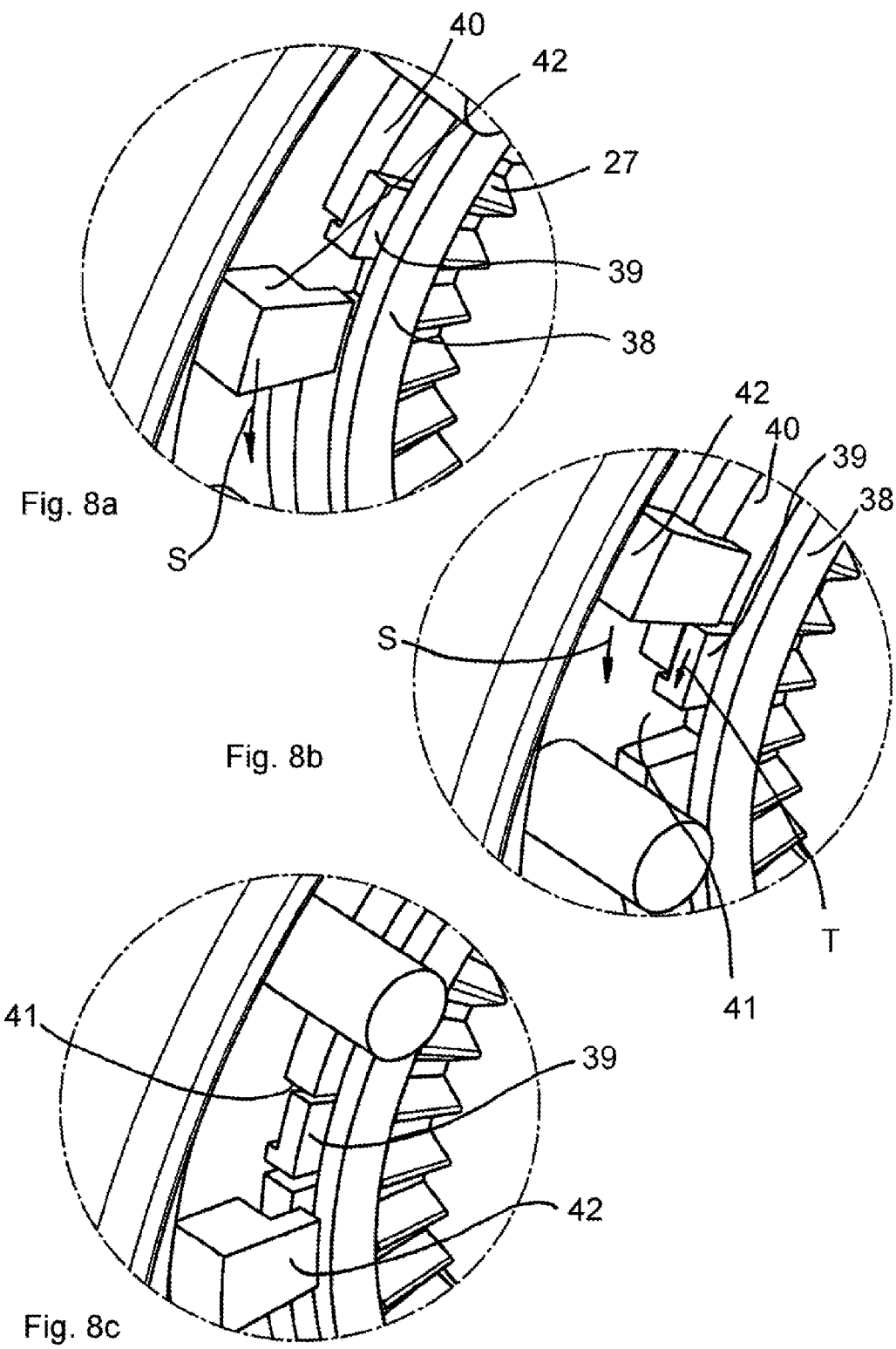
FIG. 8a-8c show the load limiting mechanism with the switching ring in different positions during the load limiting.

As can be seen in the FIGS. 7 and 8a, the switching ring 38 at the start of the load limiting is held by a carrier 39 supporting itself on the gear ring 40 in a distance from the latter so that the gears 27 and 26 cannot become engaged. The switching ring 38 functions as a releasable locking mechanism whereby the locking of the sun wheel 22 finally takes place through the interlocking of the gears 28 and 37.

As illustrated in the FIGS. 8a to 8c, the switching takes place thereby that the drive disk 17 is provided with a catch 42 which by rotation during the load limiting in the direction of arrow "S" gets into contacts at the carrier 39 and by further rotation displaces the latter in the circumferential direction. Through the displacement in the circumferential direction, the carrier 39 comes above a recess 41 in the gear ring 40 and is pushed by the spring force of the spring ring 34 in the recess. Through the axial displacement of the switching ring 38, the sun wheel 22, which was not illustrated in FIGS. 8a-8c for the sake of clarity, is no longer supported axially and can move freely between the gears 27 and 37. Since the load limiting generated by the wavelike feed motion of the inner gear ring 21 is higher than the load limiting generated by the wavelike feed motion of the sun wheel 22, the sun wheel 22 after the switching by the described movement of the switching ring 38 starts to execute the feed motion, while the inner gear ring 21 functions as a fixed bearing. Since the level of the load limiting is dependent on the severity of the accident and the characteristics of the occupant, the load limiting level generated by the wavelike feed motion of the sun wheel 22 can also be so high that the inner gear ring 21 no longer functions as a fixed bearing, but is also induced into a vibrating rotational movement. In this case, there is a serial connection of the sun wheel 22 and the inner gear ring 21 and the inner gear ring 21 has at the same time the function of an overload security.

Figure 10:
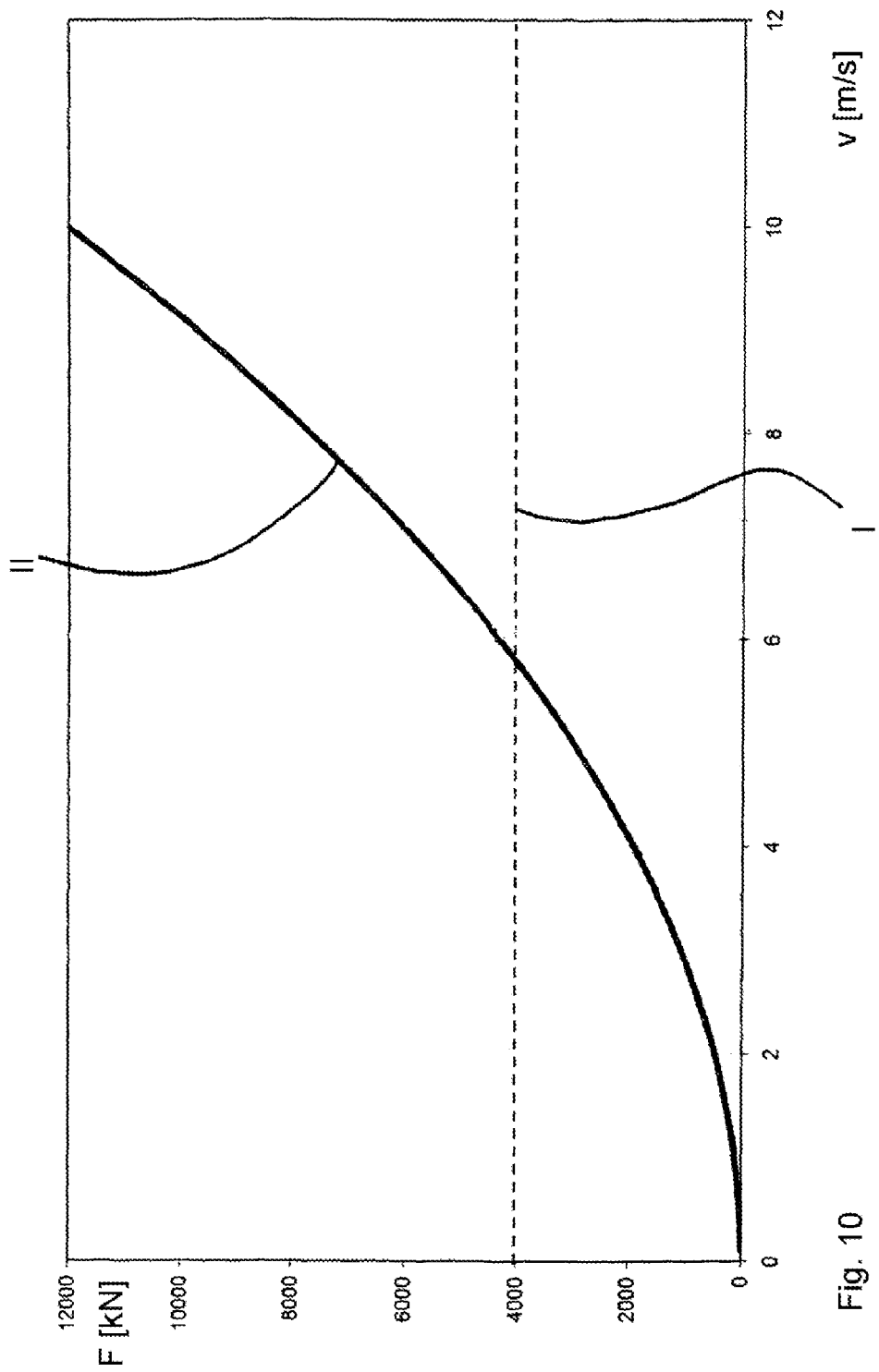
FIG. 10 shows curves of load limiting over the relative speed.

In FIG. 10, for the better understanding of the invention, the change of the load limiting applied over the belt extraction speed is shown first. The belt extraction speed in the crash results therefrom that the occupant, at the time T0 of the impact of the vehicle with the obstacle at which the vehicle speed is assumed idealized as being zero, still executes a forward movement due to his inertia so that the seat belt is pulled out of the belt retractor firmly connected to the vehicle. The straight line designated by "I" represents the course of the load limiting with a torsion rod of 4000 N according to the prior art. The load limiting level is independent of the belt extraction speed so that this kind of load limiting is neither occupant nor crash adaptive. In comparison to this the course of the load limiting with the load limiting mechanism according to the invention is represented with "II". Recognizable is the load limiting being proportional to the square of the belt webbing extraction speed. This is substantiated thereby that at higher belt extraction speed, the frequency of the oscillating system is higher and therewith also the dissipated energy through the load limiting mechanism, respectively, the connected load limiting level.

In FIG. 11 the course of the load limiting during the crash for different accident impulses and passenger types is illustrated to better understand the practical uses for the restraint function of the passenger. The curves C1 to C4 show the course of the load limiting for a crash speed of 32 km/h with a load limiting mechanism according to the invention according to FIG. 2 with 42 teeth alternately being in and out of engagement. C1 shows the curve for a HIII (Hybrid III) Dummy, 95% man, C2 is the curve of a HIII dummy 50% woman, C3 is the curve of a HIII dummy 5% woman, and finally the curve C4 for a TNO 10 year-old child. The load limiting mechanism adjusts itself, as can be seen, to the passengers so that the 95% man in the curve C1 is exposed to a significantly higher load limiting than the 5% woman (curve C3) or the 10 year-old child of curve C4. In the curve A3, the load limiting curve for a HIII dummy, a 5% woman, at a collision speed of 50 km/h, and in the curve A2 the curve for a HIII dummy, a 50% man, at a collision speed of 50 km/h is represented. Once again it can be clearly seen that the 50% man is exposed to a significantly higher load limiting than the 5% woman. The curve A1 shows the load limiting course for a HIII dummy 95% man and the curve A4 the load limiting course at a collision speed of 56 km/h with the same conclusion. The load limiting level of the load limiting mechanism according to the invention is therefore passenger-adaptive.

In the comparison of the curves C1 to C4 with the curves A1 to A4, it can be seen that the collision speeds also have a significant influence on the load limiting characteristics as can be seen, for example, with the curves A3 and C3 which only differ through the collision speeds of 32 km/h and 50 km/h. The load limiting level of the load limiting mechanism according to the invention is therefore crash-adaptive.

Further, it can be seen in the curve B1, the load limiting course of a HIII dummy 50% man and in the curve B2 the load limiting course of a HIII dummy of a 5% woman at a collision speed of 50 km/h, respectively, wherein here the load limiting mechanism has 36 teeth. The curves A2 and B1 represent therewith the load limiting curves for identical dummies with identical collision speeds with the use of load limiting mechanisms with varying number of teeth. The curve B1 of the load limiting mechanism with 36 teeth lies significantly below the curve A2 of the load limiting mechanism with 42 teeth. This can be thereby explained that the attenuation of the load limiting mechanism and therefore the level of the load limiting is decisively co-determined by the number of teeth. The more teeth the load limiting mechanism has, the higher the load limiting level.

While the above description constitutes the preferred embodiment of the present invention, it will be appreciated that the invention is susceptible to modification, variation, and change without departing from the proper scope and fair meaning of the accompanying claims.

The invention claimed is:

1. A load limiting mechanism for a motor vehicle comprising a first part and a second part moving relative to one another with an oscillating wavelike feed motion, the first part and the second part forming a first set of interlocking gears and that the oscillating wavelike feed motion results when at least one of the first part and the second part undergoes the wavelike feed motion by which the first set of interlocking gears alternately become engaged and disengaged and whereby the wavelike feed motion results in energy dissipation.

2. The load limiting mechanism according to claim 1, wherein that the first part and the second part moving relative to one another further comprise at least a second set of interlocking gears coupled with the first set of interlocking gears, and the second set of interlocking gears is offset from the first set of interlocking gears.

3. The load limiting mechanism according to claim 2, further comprising that the first set and the second set of interlocking gears are arranged on opposite sides of one of the first part and the second part, and at least two gears of the first and second sets of gears are arranged offset from one another.

4. The load limiting mechanism according to claim 1 further comprising that an attenuating means is arranged between the first set of interlocking gears for attenuating the wavelike feed motion.

5. The load limiting mechanism according to claim 4, further comprising that the attenuating means is formed of mass filling out hollow spaces between the first set of interlocking gears.

6. The load limiting mechanism according to claim 4, further comprising that the attenuating means is formed by a rubber disk arranged between the first set of interlocking gears.

7. The load limiting mechanism according to claim 1 further comprising that the load limiting mechanism is arranged to be coupled with a belt shaft of a belt retractor, and that the first part or the second part undergoing the wavelike feed motion is coupled with the belt shaft.

8. The load limiting mechanism according to claim 7, further comprising that the first part or the second part undergoing the wavelike feed motion is formed by a gear disk with a first axial gear, and the gear disk with the first axial gear is engageable with a second gear fixed to a housing of the load limiting mechanism wherein the first axial gear and the second gear form the first set of interlocking gears.

9. The load limiting mechanism according to claim 8, further comprising that the gear disk is spring loaded toward an interlocking engagement of the first axial gear and the second gear is fixed to the housing.

10. The load limiting mechanism according to claim 8 further comprising that the first axial gear forms teeth radially directed to the center of the gear disk.

11. The load limiting mechanism according to claim 7 further comprising that a transmission is provided between the belt shaft and the first part or the second part undergoing the wavelike feed motion.

12. The load limiting mechanism according to claim 11, further comprising that the transmission is in the form of a planetary gear unit having planetary gear wheels, a sun wheel, and an inner wheel encircling the sun wheel, that the belt shaft is connected with the planetary gear wheels, a gear of the first set of interlocking gears is formed by the sun wheel and a gear of a second set of interlocking gears is formed by the inner gear ring.

13. The load limiting mechanism according to claim 12, further comprising in that the wavelike feed motion caused by first set of interlocking gears and the wavelike feed motion of the second set of interlocking gears generate different load limiting levels.

14. The load limiting mechanism according to claim 13 further comprising that one of the sun wheel and the inner gear ring includes a releasable locking mechanism.

15. The load limiting mechanism according to claim 14, further comprising that the releasable locking mechanism is assigned to the first or the second set of interlocking gears which, respectively, generates a lower load limiting level.

16. The load limiting mechanism according to claim 12 wherein the load limiting mechanism further comprises a housing, and that between the housing and the belt shaft or the planetary gear unit means for limiting a rotational angle are provided.

17. The load limiting mechanism according to claim 16, further comprising that the means for limiting a rotational angle is formed by one or a plurality of third gear wheels, which mesh with a fourth gear assigned to the housing and with a fifth gear assigned to the belt shaft, a sixth gear assigned to a drive disk is locked with the belt shaft or assigned to the planetary gear unit, and a channel formed by the fourth gear tapers toward a channel end for limiting the rotation of the drive disk.

18. The load limiting mechanism according to claim 1, in which the oscillating wavelike feed motion is a frequency controlled oscillating movement.

* * * * *